United States Patent [19]
Sekkelsten

[11] Patent Number: 5,234,515
[45] Date of Patent: Aug. 10, 1993

[54] METHOD OF CONNECTING TWO ELECTRICAL CONDUCTORS

[75] Inventor: Ulf A. Sekkelsten, Sofiemyr, Norway

[73] Assignee: Alcatel Stk A/S, Oslo, Norway

[21] Appl. No.: 825,666

[22] Filed: Jan. 24, 1992

[30] Foreign Application Priority Data

Feb. 11, 1991 [NO] Norway ................................ 910524

[51] Int. Cl.[5] ...................... B65H 69/06; B21F 15/06
[52] U.S. Cl. ..................................... 156/49; 156/158;
264/135; 264/263; 264/251; 264/254; 29/869;
174/75 R
[58] Field of Search .......................... 156/49, 158, 245;
264/135, 263, 251, 254; 29/869, 870, 871;
174/84 R, 88 R, 75 R

[56] References Cited

U.S. PATENT DOCUMENTS

| | | | |
|---|---|---|---|
| 2,287,163 | 6/1942 | Bishop | 264/263 X |
| 2,635,975 | 4/1953 | Peters | 174/84 R X |
| 2,645,819 | 7/1953 | Pouzet | 264/263 X |
| 2,800,560 | 7/1957 | Schrotter et al. | 264/263 X |
| 3,324,441 | 6/1967 | Olsen et al. | 174/84 R |
| 3,777,048 | 12/1973 | Traut | 174/84 R X |
| 4,610,737 | 9/1986 | Bacon et al. | 156/49 |

FOREIGN PATENT DOCUMENTS 1515547 10/1969 Fed. Rep. of Germany .
540300 10/1941 United Kingdom .

Primary Examiner—Michael W. Ball
Assistant Examiner—Francis J. Lorin
Attorney, Agent, or Firm—Spencer, Frank & Schneider

[57] ABSTRACT

Interconnecting two insulation sheathed conductors in subsea environments is done using a subsea connector including a metal conductor splice pin arrangement and a splice insulation sleeve. A metal tube is placed over the splice insulation sleeve. The conductor insulation sheaths are molded to respective opposite sides of the metal tube.

10 Claims, 1 Drawing Sheet

METHOD OF CONNECTING TWO ELECTRICAL CONDUCTORS

BACKGROUND OF THE INVENTION

1. Field of the Invention

The present invention relates to a method and means for interconnecting two insulated conductors in subsea environments and in particular for use with conductors having non-compatible insulation material such as PE and a rubber.

2. Background Information

High water pressures and with time it is difficult and nearly impossible to prevent water from entering joint compartments. One entrance to a joint compartment is along the cable conductor underneath the conductor insulation. Remedies have been proposed for filling all spaces within a multifilament conductor and good effects have been obtained at low outer water pressure.

In conventional joints the whole joint is covered with a common insulation sleeve. The problem is however to obtain sufficient bonding between the conductor insulations and the common insulation sleeve. When the two conductors to be jointed have identical or compatible insulation sheaths, sufficient bonding will be obtained with a common joint sleeve. This is, however, not possible when one conductor has PE insulation and the other has rubber (e.g. Hypalon, Neoprene) insulation.

SUMMARY OF THE INVENTION

One object of this invention is to improve subsea cable conductor joints. In particular the object is to improve an interconnection between the conductor insulation of an umbilical cable and the conductor insulation of the interfacing subsea equipment according to the invention. With a conductor joint as defined there is obtained a unique waterproof connection between two insulated conductors, in particular between conductors having sheaths of different insulation material.

BRIEF DESCRIPTION OF THE DRAWING

Above mentioned and other features and objects of the present invention will clearly appear from the following detailed description of embodiments of the invention taken in conjunction with the drawing which shows a splice between conductors schematically.

DETAILED DESCRIPTION OF THE PREFERRED EMBODIMENTS

Figure 1:
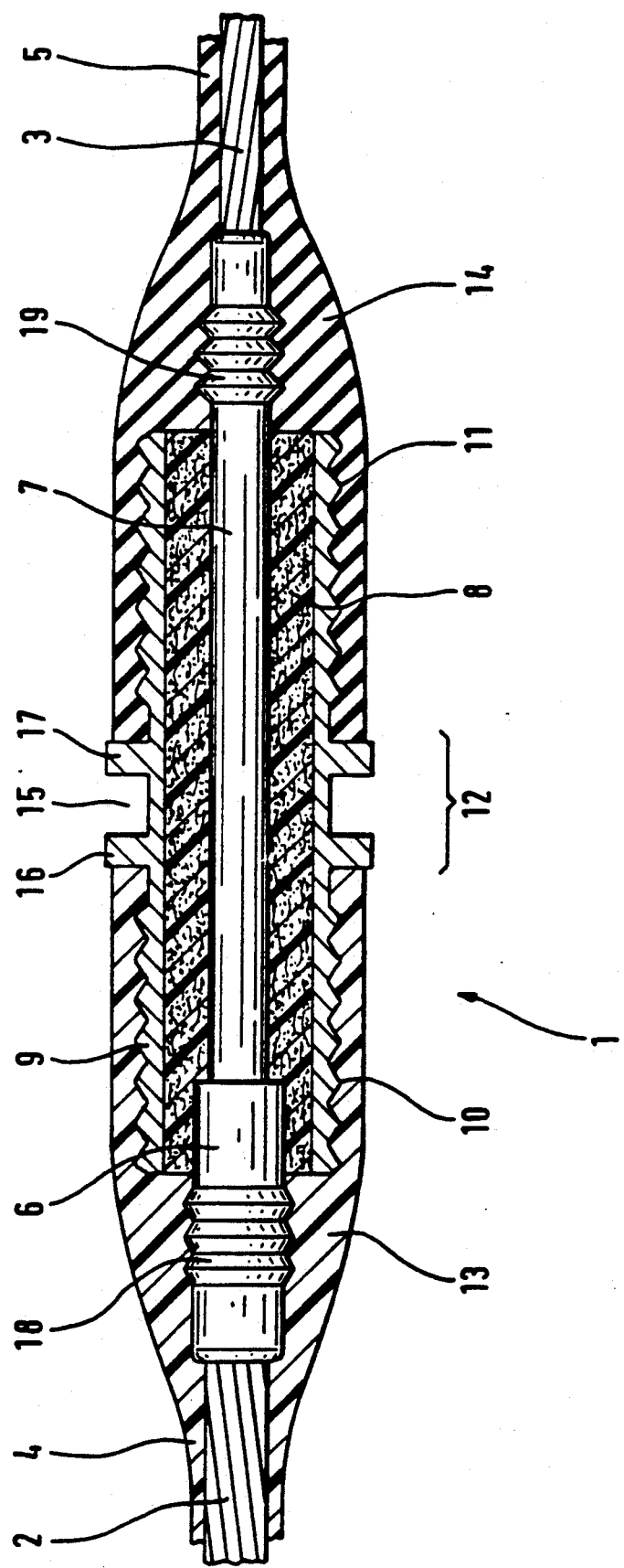

In the figure is schematically illustrated a splice or joint 1 between two conductors 2 and 3 having insulation sheaths 4 and 5. The conductor insulation 4 is polyethylene (PE) which is commonly used in umbilical cables and the conductor insulation 5 may be Hypalon, Neoprene or some other suitable rubber material which is used for wiring within offshore installations.

As mentioned the main object of the invention is to provide a waterproof splice between a PE insulated conductor and a conductor with a rubber (e g Hypalon, Neoprene) insulation. A secondary object is to prevent water which may have entered the umbilical cable and the PE conductor insulation from entering the offshore installation. The two conductors 2 and 3 are therefore joined with a splice pin arrangement 6 and 7 so that water within the multifilament conductor 2 cannot penetrate to the multifilament conductor 3.

The splice pin arrangement 6,7 which is preferably made of brass is covered by an insulator 8 of, for example, glass fiber reinforced epoxy material. Part of the outer surface of the pin arrangement 6,7 is provided with grooves 18,19 in order to provide good bonding to the joint compounds. Over the insulator 8 there is arranged a tube 9 of metal such as stainless steel. The tube 9 is advantageously provided with corrugated outer surfaces 10,11 in order to obtain good bonding and increase the bonding surface to the insulation material used in the joint.

In the case where the two conductors have different conductor insulation, it may be necessary to pretreat the surface of the pin 6 and the surface 10 of the tube 9 up to the flanged section, differently from the treatment of the surface of the pin 7 and the surface 11 of the tube 9. Low density polyethylene is baked into the surface on the PE side of the tube and pin, whereas the rubber side of the tube/pin is treated with a two component primer compatible with the rubber.

Application of joining compounds may involve heating to different temperatures and one feature of the invention is therefore to separate the surfaces 10 and 11 by a partition 12. The partition 12 can have a U-shaped cross-section including an airspace 15 between two partition walls 16,17 for separating the two sheath moldings 13,14.

The PE sheathed conductor 2,4 is molded to the surface of the pin 6 and to the corresponding side of the tube 9 by using a compound consisting 13 of low density polyethylene which is applied at a temperature of some 180° C. for a period of some 10 minutes after a soaking period.

The rubber sheathed conductor 3,5 is molded to the surface of the pin 7 and to the corresponding side of the tube 9 by using a compound 14 consisting of a compatible rubber compound which is applied at a temperature of 150°-170° C. for a period of 30 to 60 minutes.

The PE sheathed conductor 2,4 which requires higher molding temperature, is molded to the tube/pin 9,6,7 prior to molding of the rubber sheathed conductor 3,5 in order to prevent melting of the insulation material. This problem is also minimized by the unique design of the partition of the tube 9.

With such a design of the joint, the insulation 4 of the conductor 2 may be bonded or molded to the pretreated surface 10 of the tube 9 with an insulation compound 13 which is compatible with the material 4 (and not with the insulation material 5). The arrangement can be similar on the other side of the joint where insulation compound 14 compatible with the insulation material 5 is bonded or molded to a pretreated surface 11 of the tube 9.

The molding compounds 13 and 14 must also be capable of bonding to the pretreated surfaces of the splice pin arrangement 6,7.

I claim:

1. A method for connecting two electrical conductors having insulation sheaths with a subsea connector, including the steps of:

joining the conductors within a metal conductor splice pin arrangement and covering at least a part of the metal splice pin arrangement with an insulation sleeve;

placing a metal tube over the insulation sleeve; and molding the conductor insulation sheaths of both conductors to respective opposite sides of the metal tube and metal conductor splice pin arrangement.

2. A method according to claim 1, further including pretreating outer surfaces of at least one of the metal tube and the metal conductor splice pin arrangement with at least one of a primer and baking low density polyethylene into the surfaces to increase bonding with the molded conductor insulation sheaths.

3. A method according to claim 2 wherein the conductors have non-compatible sheath insulation materials, such as PE and rubber, wherein individual molding compounds for molding the insulation sheaths to respective opposite sides of the metal tube and metal conductor splice pin arrangement are used, said molding compounds being compatible with the respective conductor insulation sheaths and with the pretreated surfaces of the metal tube and metal conductor splice pin arrangement.

4. A method according to claim 3, wherein a PE sheathed conductor is molded to the metal conductor splice pin arrangement and to the corresponding side of the metal tube by using a compound consisting of low density polyethylene applied at a temperature of about 180° C. for a period of about 10 minutes.

5. A method according to claim 4, wherein a rubber sheathed conductor is molded to the metal conductor splice pin arrangement and to the corresponding side of the metal tube by using a compound consisting of a compatible rubber compound applied at a temperature in the range of 150°–170° C. for a period in the range of 30 to 60 minutes.

6. A method according to claim 5, wherein the PE sheathed conductor is molded to the metal tube and metal conductor splice pin arrangement prior to molding of the rubber sheathed conductor.

7. A method according to claim 1, wherein prior to the joining step, at least a part of the outer surface of at least one of: the metal tube and the metal conductor splice pin arrangement, has corrugations to thereby ensure good bonding and increase bonding surfaces.

8. A method according to claim 7, wherein prior to the joining step, the metal tube has partition means for separating the insulation sheaths of the two conductors.

9. A method according to claim 8, wherein prior to the joining step, the partition means has a U-shaped cross-section, two walls, and an airspace between the two walls for separating the insulation sheaths of the two conductors.

10. A method according to claim 7, wherein prior to the joining step, the metal tube is stainless steel.

* * * * *